Feb. 15, 1944.   S. M. HULL   2,341,617
METHOD OF AND APPARATUS FOR MOLDING
Filed Jan. 9, 1936
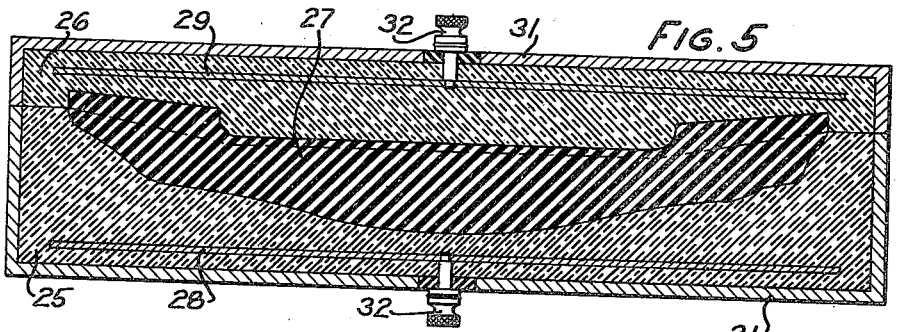
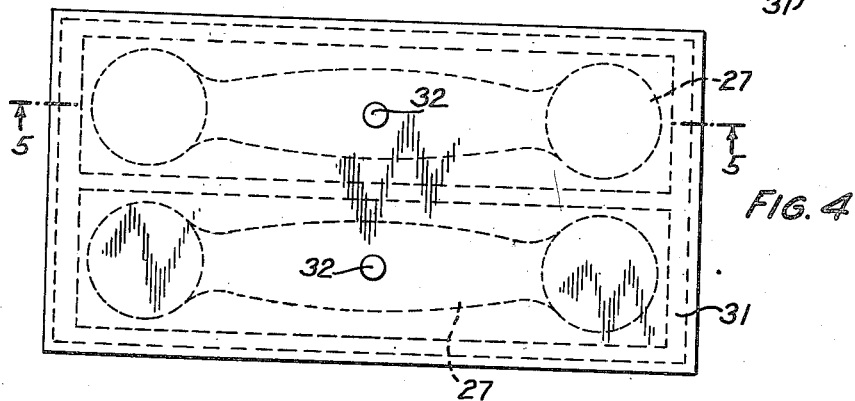
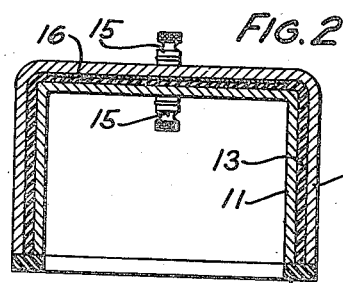
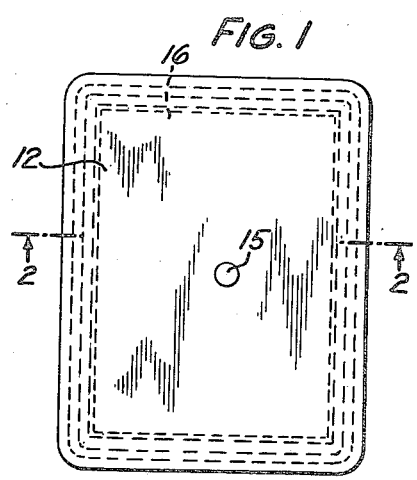
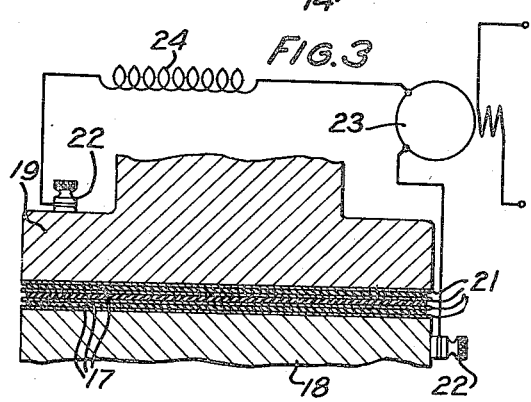
INVENTOR
S. M. HULL
BY H. A. Whitehorn
ATTORNEY Patented Feb. 15, 1944

2,341,617

UNITED STATES PATENT OFFICE 2,341,617

METHOD OF AND APPARATUS FOR MOLDING

Sidney M. Hull, Western Springs, Ill., assignor to Western Electric Company, Incorporated, New York, N. Y., a corporation of New York Application January 9, 1936, Serial No. 58,318

5 Claims. (Cl. 18—34)

This invention relates to a method of and apparatus for molding and more particularly to a method of and apparatus for molding thermosetting or thermoplastic compounds.

The method of curing thermoreactive materials in heated molds has numerous disadvantages in that the surface of the molded article becomes heated first and partially cures causing the entrapment of gases liberated in the process which frequently results in blistering of the article being molded. Also, a considerable amount of time and heat energy is lost in heating and cooling the molds for each molding operation.

An object of the present invention is to provide an effective and efficient method of and apparatus for molding thermosetting and thermoplastic compounds.

In accordance with one embodiment of the invention, a thermosetting resin is placed in a mold made of insulating material in which the product of the dielectric constant and loss angle are low. Electrodes are provided for the mold which form the plates of a condenser and when a high frequency alternating current is applied to the plates heat will be generated internally in the resin to cure the resin since the product of its dielectric constant and loss angle are relatively high.

Other objects and advantages will appear from the following description taken in conjunction with the accompanying drawing, in which Fig. 1 is an elevational view of a mold embodying the invention;

Fig. 2 is a sectional view taken on line 2—2 of Fig. 1;

Fig. 3 is a sectional view partly schematic of another form of the invention;

Fig. 4 is a plan view of a further form of the invention, and

Fig. 5 is a sectional view taken on line 5—5 of Fig. 4.

The invention will be described in connection with the molding of a phenol resin, although it will be evident the invention is applicable to any material which has an appreciable dielectric loss angle, such as rubber, cellulose esters and the like.

In the molding of thermoreactive and thermoplastic materials, gases may be evolved in the consolidation of the material by heat. In phenol resins, for instance, water is given off during the condensation reaction and ordinarily there is also an evolution of gas from the catalyst used in the condensation, such as ammonia gas when hexymethylene tetramine is used as a catalyst.

In the case of cellulose esters the vapors of solvents are liberated on the application of heat to consolidate the material. It follows from this that the heat for molding thermoreactive and thermoplastic materials should preferably be generated in the material itself in order to avoid the entrapment of vapors by the consolidation of the outer shell of the article being molded when heat is applied externally. Also, since these molding materials are notoriously good insulators the heat is conducted slowly therethrough, and, therefore, a considerable period of time is required to uniformly heat the material being molded.

The present invention contemplates the heating of the material itself by means of an alternating electrostatic field.

Fig. 1 illustrates an application of this principle to the molding of a subset cover for telephone apparatus. In this figure, an internal mold section 11 and an external mold section 12 are shown. The space between these mold sections is filled with a phenol aldehyde resin 13 and the mold sections 11 and 12 are made of metal. The ends of these mold sections are closed by a peripherally extending bar of insulating material 14 secured to the mold section 11. Each of the mold sections is provided with a terminal 15 for connecting them to an alternating current circuit. For a given voltage and frequency applied to the terminals, the heat generated in the phenol resin will depend upon the product of the dielectric constant and the loss angle or power factor of the resin.

Since the mold sections have a relatively negligible resistance, no heat will be generated therein and, therefore, the surface of the material will not be cured in advance of the interior of the material, thus allowing the gases to escape through the juncture of the mold sections without blistering the surface of the material.

In some cases the cross section of a material is not uniform. As shown in Fig. 2, for instance, the upper wall of the subset cover is provided with a concave indentation. If the mold sections were made to follow this contour, the capacity of the thin cross section would be increased with the result that this section would be heated to a greater extent than the portions of greater cross section. For this reason an insulating insert 16 of glass or other suitable insulating material, is attached to the mold section 12 to insure a uniform heating of the article being molded.

Fig. 3 illustrates the application of the invention to the molding of fibre sheets impregnated with a phenol aldehyde resin. The phenol fibre sheets 17 are placed between sections 18 and 19 of a press and the sheets are separated from each other by means of metallic sheets, such as copper sheets 21. A terminal 22 is provided on each of the sections of the press to connect the sections in an electrical circuit comprising an alternator 23 and inductance 24. The inductance 24 is preferably so chosen that in connection with the condenser formed by the press and the material being molded, the circuit will be resonant.

Figs. 4 and 5 illustrate the application of the invention to the molding of handles for cradle type telephone sets. The mold sections 25 and 26 are preferably made of glass which has a low dielectric constant and low loss angle.

Pyrex glass has a dielectric constant of 4.9 and a loss angle of 0.24, the product of which is 1.18. The phenol resin has a dielectric constant in the neighborhood of 5.3 and a loss angle of approximately 3, the product of which is 15.9. The phenol resin molding composition 27 will, therefore, heat at a rate of approximately 13½ times that of the mold sections. In addition to this, both the dielectric constant and loss angle of the phenol resin increase proportionately more with a rise in temperature than the same factors in Pyrex glass so that as the material is brought to molding temperature, relatively more heat will be generated in the material being molded than at the beginning of the molding operation.

In order to apply an electrostatic field to the mold shown in Figs. 4 and 5, electrode plates 28 and 29 may be molded directly into the glass. The metal for these plates being chosen to have a coefficient of heat expansion similar to that of glass to avoid breaking the glass. In some cases, particularly where considerable pressures are applied to the mold, it is advisable to encase the mold sections in steel boxes 31. A terminal 32 is provided on each of the mold sections and is connected to the electrode plates while being insulated from the steel jacket 31. While the electrodes 28 and 29 are shown as parallel plates, they may have other configurations to vary the distribution of the electrostatic field and thereby control the heating of various parts of the article being molded as desired.

When phenol resins are molded by applying heat externally to the molds, a phenol powder must be placed in relatively cold molds in order to heat the molding material more uniformly with the result that the molds must be cooled after the ejection of the molded article. This involves the waste of a substantial amount of heat energy and, furthermore, it lengthens the molding cycle.

By generating the heat in the molding material itself it is not necessary to heat the molds and the heating of the molding material may proceed at a much more rapid rate since all of the material will be heated at the same rate and does not depend upon conduction of heat through the material. The rate of heating may be controlled by varying either the voltage or frequency of the applied current. For a given installation it is preferable to select a definite frequency and provide for a voltage control to obtain the desired rate of heating.

It will be evident that the nature and embodiments of the invention herein described are merely illustrative and that the various changes and modifications may be made therein without departing from the spirit and scope of the invention.

What is claimed is:

1. A mold for electrostatically molding material comprising a pair of mold sections of electrical insulating material forming a mold cavity, a pair of parallel plates of electrical conducting material, one of which is embedded in each of said mold sections, and means for applying an alternating electrical potential to said plates.

2. The method of molding a phenol resin base compound into articles which comprises placing the compound in a multi-section mold of dielectric material with a cavity shaped to the form of the article and having electrically conducting elements therein, and applying an alternating electrical potential to said elements to set up an alternating electrostatic field in said compound to heat and consolidate the resin, the mold being maintained at a relatively lower temperature to permit the escape of volatile reaction products generated during the consolidation of the resin through the joints between the mold sections.

3. A mold for electrostatically molding material, comprising a pair of mold sections of electrical insulating material forming a mold cavity, a pair of plates of electrical conducting material whose perpendicularly opposite points are equidistantly spaced, one of said plates being embedded in each of said mold sections, and means for applying an alternating electrical potential to said plates.

4. A mold for electrostatically molding material comprising a pair of mold sections of Pyrex glass forming a mold cavity, a pair of plates of electrical conducting material whose perpendicularly opposite points are equi-distantly spaced, one of said plates being embedded in each of said mold sections, and means for applying an alternating electrical potential to said plates.

5. A mold for electrostatically molding material comprising a pair of mold sections of dielectric material, whose product of dielectric constant and loss angle is less than 3, forming a mold cavity, a pair of plates of electrical conducting material whose perpendicularly opposite points are equi-distantly spaced, one of said plates being embedded in each of said mold sections, and means for applying an alternating electrical potential to said plates.

SIDNEY M. HULL.